US007789275B2

(12) United States Patent
Englhard et al.

(10) Patent No.: US 7,789,275 B2
(45) Date of Patent: *Sep. 7, 2010

(54) PUMP ASSEMBLY WITH CONTINUOUS TUBE

(75) Inventors: Ronald F. Englhard, Dove Canyon, CA (US); Donald J. Shanklin, Corona, CA (US)

(73) Assignee: Meadwestvaco Calmar, Inc., Grandview, MO (US)

( * ) Notice: Subject to any disclaimer, the term of this patent is extended or adjusted under 35 U.S.C. 154(b) by 273 days.

This patent is subject to a terminal disclaimer.

(21) Appl. No.: 11/224,677

(22) Filed: Sep. 12, 2005

(65) Prior Publication Data

US 2006/0060613 A1 Mar. 23, 2006

Related U.S. Application Data

(63) Continuation of application No. 10/406,147, filed on Apr. 2, 2003, now Pat. No. 6,953,133.

(60) Provisional application No. 60/370,109, filed on Apr. 2, 2002.

(51) Int. Cl.
*G01F 11/10* (2006.01)

(52) U.S. Cl. ........................ 222/385; 222/401; 222/501; 239/333

(58) Field of Classification Search ................. 222/212, 222/213, 321.9, 322, 324, 380, 385, 401, 222/501, 79; 239/333, 373, 154
See application file for complete search history.

(56) References Cited

U.S. PATENT DOCUMENTS 665,914 A 1/1901 Kindermann
1,417,951 A 5/1922 Staples et al.
1,671,779 A 5/1928 Pearsons
1,681,845 A 8/1928 Dilley et al.

(Continued)

FOREIGN PATENT DOCUMENTS

AP 98/5738 8/1993

(Continued)

OTHER PUBLICATIONS

Copending U.S. Appl. No. 10/969,801, filed Oct. 20, 2004.

*Primary Examiner*—Kevin P Shaver
*Assistant Examiner*—Melvin A Cartagena
(74) *Attorney, Agent, or Firm*—MWV Intellectual Property Group

(57) ABSTRACT

A noncontainer pressurizing pump sprayer includes a body, which defines a chamber. A piston is positioned within the container and is coupled to a shaft. The piston divides the chamber into an upper section and a lower section. An inlet valve is positioned on the body and permits flow of fluid into the lower section but restricts flow out of the lower section. The shaft of the piston is coupled to a handle. A spray nozzle includes an actuator that is coupled to a control valve and a discharge outlet that is in fluid communication with the lower section of the chamber. In one embodiment, a tube extends continuously from a point upstream of the control valve to a point downstream of the control valve. In another embodiment, a tube is coupled to the piston and extends through the handle. In another embodiment, the tube extends continuously from the spray nozzle and is coupled to the piston.

40 Claims, 15 Drawing Sheets

U.S. PATENT DOCUMENTS

| | | | |
|---|---|---|---|
| 1,730,684 | A | 10/1929 | Phillips |
| 1,814,504 | A | 7/1931 | Collins |
| 2,048,142 | A | 7/1936 | Santurello |
| 2,060,297 | A | 11/1936 | Fox |
| 2,096,042 | A | 10/1937 | Clifford |
| 2,198,933 | A | 4/1940 | Damkroger et al. |
| 2,232,522 | A | 2/1941 | Gray |
| 2,341,031 | A | 2/1944 | Flynn |
| 2,342,288 | A | 2/1944 | Mai |
| 2,474,748 | A | 6/1949 | McMurray |
| 2,521,164 | A | 9/1950 | Hayes |
| 2,537,872 | A | 1/1951 | Wright |
| 2,545,319 | A | 3/1951 | Sundholm |
| 2,865,540 | A | 12/1958 | Gray |
| 2,881,810 | A | 4/1959 | Breitenstein |
| 3,002,699 | A | 10/1961 | Pinke |
| 3,092,330 | A | 6/1963 | Ridenour et al. |
| 3,129,856 | A | 4/1964 | Jokelson |
| 3,299,960 | A | 1/1967 | Stern |
| 3,584,834 | A | 6/1971 | Reid et al. |
| 3,730,398 | A | 5/1973 | Goda |
| 3,792,800 | A | 2/1974 | Capra et al. |
| 3,797,748 | A | 3/1974 | Nozawa et al. |
| 3,901,449 | A | 8/1975 | Bochmann |
| 3,921,861 | A | 11/1975 | Kondo |
| 3,940,029 | A | 2/1976 | Horvath |
| 4,050,860 | A | 9/1977 | Beres |
| 4,105,145 | A | 8/1978 | Capra |
| 4,109,832 | A | 8/1978 | Kutik et al. |
| 4,155,489 | A | 5/1979 | Steiman |
| 4,167,941 | A | 9/1979 | Capra et al. |
| 4,174,055 | A | 11/1979 | Capra et al. |
| 4,176,764 | A | 12/1979 | Capra et al. |
| 4,183,449 | A | 1/1980 | Blake |
| 4,192,464 | A | 3/1980 | Chow |
| 4,210,261 | A | 7/1980 | Trujillo et al. |
| 4,222,500 | A | 9/1980 | Capra et al. |
| 4,222,501 | A | 9/1980 | Hammett et al. |
| 4,231,493 | A | 11/1980 | Kutik et al. |
| 4,235,353 | A | 11/1980 | Capra et al. |
| 4,260,082 | A | 4/1981 | Rooney et al. |
| 4,271,990 | A | 6/1981 | Kutik et al. |
| 4,316,600 | A | 2/1982 | Parise et al. |
| 4,325,499 | A | 4/1982 | Shay |
| 4,325,500 | A | 4/1982 | Shay |
| 4,325,501 | A | 4/1982 | Shay |
| 4,350,299 | A | 9/1982 | Stephenson et al. |
| 4,392,594 | A | 7/1983 | Swett et al. |
| 4,420,097 | A | 12/1983 | Motsenbocker |
| 4,524,888 | A | 6/1985 | Tada |
| 4,618,099 | A | 10/1986 | Nagao et al. |
| 4,635,830 | A | 1/1987 | Wehr et al. |
| 4,809,878 | A | 3/1989 | Rainey |
| 4,863,302 | A | 9/1989 | Herzfeld et al. |
| 4,872,595 | A | 10/1989 | Hammett et al. |
| 4,899,913 | A | 2/1990 | Ruscitti et al. |
| 4,901,878 | A | 2/1990 | Humphries |
| 4,930,686 | A | 6/1990 | Ellison |
| 4,964,547 | A | 10/1990 | Lina |
| 5,064,168 | A | 11/1991 | Raines et al. |
| 5,183,189 | A | 2/1993 | Baudin |
| 5,363,993 | A | 11/1994 | Mascitelli et al. |
| 5,373,973 | A | 12/1994 | Foster |
| 5,375,745 | A | 12/1994 | Ritsche |
| 5,381,932 | A | 1/1995 | Humphrey |
| 5,395,032 | A | 3/1995 | Fuchs |
| 5,419,463 | A | 5/1995 | Mizushima et al. |
| 5,429,275 | A | 7/1995 | Katz |
| 5,469,993 | A | 11/1995 | Hauf et al. |
| 5,485,942 | A | 1/1996 | Foster |
| 5,497,944 | A | 3/1996 | Weston et al. |
| 5,553,750 | A | 9/1996 | Foster |
| 5,601,211 | A | 2/1997 | Foster |
| 5,609,272 | A | 3/1997 | Brass et al. |
| 5,649,664 | A | 7/1997 | Brass et al. |
| 5,651,908 | A | 7/1997 | Mansfield |
| 5,676,314 | A | 10/1997 | Brass et al. |
| 5,755,361 | A | 5/1998 | Restive et al. |
| 5,810,211 | A | 9/1998 | Shanklin et al. |
| 5,816,447 | A | 10/1998 | Shanklin et al. |
| D402,205 | S | 12/1998 | Shanklin et al. |
| 5,860,574 | A | 1/1999 | Shanklin et al. |
| D407,312 | S | 3/1999 | Shanklin et al. |
| 5,918,782 | A | 7/1999 | Shanklin et al. |
| 5,938,116 | A | 8/1999 | Restive et al. |
| 6,089,414 | A | 7/2000 | Shanklin et al. |
| 6,095,434 | A | 8/2000 | Montenegro |
| 6,170,706 | B1 | 1/2001 | Havlovitz |
| 6,217,331 | B1 | 4/2001 | Rogers et al. |
| 6,264,120 | B1 | 7/2001 | Wintering et al. |
| 6,296,154 | B1 | 10/2001 | Shanklin et al. |
| 6,322,051 | B1 | 11/2001 | Salmela |
| 6,367,775 | B1 | 4/2002 | Nimberger |
| 6,405,907 | B1 | 6/2002 | Roberts |
| 6,415,956 | B1 | 7/2002 | Havlovitz |
| 6,953,137 | B2 | 10/2005 | Nakano et al. |

FOREIGN PATENT DOCUMENTS

| | | | |
|---|---|---|---|
| EP | 0 963912 | | 7/1964 |
| EP | 0 583 902 | A1 | 2/1994 |
| EP | 0583902 | | 2/1998 |
| GB | 963912 | | 7/1964 |
| GB | 2 269 796 | A | 2/1994 |
| GB | 2269796 | | 2/1994 |
| WO | WO 94/03278 | | 2/1994 |
| ZA | 935738 | | 8/1993 |

PUMP ASSEMBLY WITH CONTINUOUS TUBE

PRIORITY INFORMATION

This application is a continuation of U.S. patent application Ser. No. 10/406,147, filed Apr. 2, 2003 now U.S. Pat. No. 6,953,133, which claims the priority benefit under 35 U.S.C.§119(e) of Provisional Application 60/370,109 filed Apr. 2, 2002.

BACKGROUND OF THE INVENTION

1. Field of the Invention

This invention relates to pumps and, in particular, to nonaerosol pump sprayers

2. Description of the Related Art

Noncontainer pressurizing pump sprayers commonly utilize an integral cylinder and plunger arrangement to generate pressure to expel liquid, such as insecticide and fertilizer from a container. Noncontainer pressurizing pump sprayers are desirable in that they do not utilize pressurized containers which must be handled carefully and at controlled temperatures to avoid the risk of explosion. Noncontainer pressurizing pump sprayers have a number of other advantages, including not using propellants which destroy the ozone and being relatively inexpensive.

There are two common varieties of noncontainer pressurizing pump sprayers: pump sprayers that are pressurized on the upstroke and pump sprayers that are pressurized on the downstroke. Pump sprayers that are pressurized on the downstroke typically utilize a return spring which biases the plunger upward after the pressurization stroke. Examples of such noncontainer pressurizing pumps can be found in U.S. Pat. Nos. 4,174,055 and 6,296,154. While these arrangements have been successful, noncontainer pressurizing pumps are still relatively complicated and expensive devices. As such, there is a general need to develop noncontainer pressuring pumps that utilize fewer parts and/or can be made out of less expensive materials.

SUMMARY OF THE INVENTION

The present invention includes an apparatus and pump attachment particularly adapted to form a noncontainer pressurizing pump sprayer which overcomes the drawbacks of the prior art.

One aspect of an embodiment of the present invention is a pump attachment for a container. The pump attachment comprises a body, a shaft, a piston, a handle and a spray nozzle. The body defines a chamber and having a first end and a second end and a wall extending between the first end and the second end. The shaft extends through an opening in the first end of the chamber. The piston is reciprocally mounted within the chamber. The piston includes an upper surface and a lower surface and a bore extending from the upper surface to the lower surface. The piston is in sealing engagement with the interior wall of the body. The piston separates the chamber into an upper portion above the upper surface of the piston and a lower portion below the lower surface of the piston. The handle is coupled to the piston through the shaft. An inlet valve at the second end of the body is configured to permit the flow of fluid into the chamber and restrict the flow of fluid out of the chamber. A biasing member is positioned between the piston and the first end of the elongate chamber. The spray nozzle comprises an actuator and a discharge outlet. The actuator is coupled to a spray valve for controlling the flow of chemical from the lower portion of the chamber through the spray nozzle to the discharge outlet. The spray nozzle includes a tube that extends continuously from a point upstream of the spray valve to a point downstream of the spray valve. The point upstream of the spray valve is in fluid communication with the lower portion of the chamber and the point downstream of the spray valve is in fluid communication with the discharge outlet. In certain embodiments, the pump attachment is used in combination with a container, which defines a cavity for storing a chemical.

Another aspect of an embodiment of the present invention is a pump attachment for a container comprising a body, a shaft, a piston, a handle and a spray nozzle. The body defines a chamber having a first end and a second end and a wall extending between the first end and the second end. The shaft extends through an opening in the first end of the chamber. The piston is reciprocally mounted within the chamber. The piston includes an upper surface and a lower surface and a bore extending from the upper surface to the lower surface. The piston is in sealing engagement with the interior wall of the body. The piston separates the chamber into an upper portion above the upper surface of the piston and a lower portion below the lower surface of the piston. The handle coupled to the piston through the shaft. An inlet valve is at the second end of the body and is configured to permit the flow of fluid into the chamber and restrict the flow of fluid out of the chamber. A biasing member lies between the piston and the first end of the elongate chamber. The spray nozzle comprises a body that defines an internal channel having an inlet end, an actuator and a discharge outlet. The actuator is coupled to a spray valve for controlling the flow of chemical from the lower portion of the chamber through the spray nozzle to the discharge outlet. A continuous piece of tubing which has a first end is coupled to the piston and is in fluid communication with the lower portion of the chamber and has a second end, which extends into the spray nozzle through the inlet end of the internal channel. In certain embodiments, the pump attachment is used in combination with a container, which defines a cavity for storing a chemical.

Yet another aspect of an embodiment of the present invention is a pump attachment for a container that comprises a body defining a chamber and having a first end and a second end and a wall extending between the first end and the second end. A piston is reciprocally mounted within the chamber. The piston includes an upper surface and a lower surface and a bore extending from the upper surface to the lower surface. The piston is in sealing engagement with the interior wall of the body. The piston separates the chamber into an upper portion above the upper surface of the piston and a lower portion below the lower surface of the piston. A handle is coupled to the piston through a relatively rigid connective member. A continuous piece of flexible tubing which has a first end, is coupled to the piston and is in fluid communication with the lower portion of the chamber. An inlet valve is at the second end of the body. The inlet valve is configured to permit the flow of fluid into the chamber and restrict the flow of fluid out of the chamber. A biasing member is positioned between the piston and the first end of the elongate chamber. A spray nozzle comprises an actuator and a discharge outlet, which is in fluid communication with a second end of the flexible tubing. The actuator being coupled to a spray valve for controlling the flow of chemical from the lower portion of the chamber through the spray nozzle to the discharge outlet. In certain embodiments, the pump attachment is used in combination with a container, which defines a cavity for storing a chemical.

Although this invention has been described in terms of certain preferred embodiments, other embodiments that will be apparent to those of ordinary skill in the art are intended to be within the scope of this invention. Accordingly, the scope of the invention is intended to be defined by the claims that follow.

BRIEF DESCRIPTION OF THE DRAWINGS

These and other aspects of the invention will now be discussed in connection with the accompanying drawings, which form a part hereof.

DETAILED DESCRIPTION OF THE PREFERRED EMBODIMENTS

Figure 1:
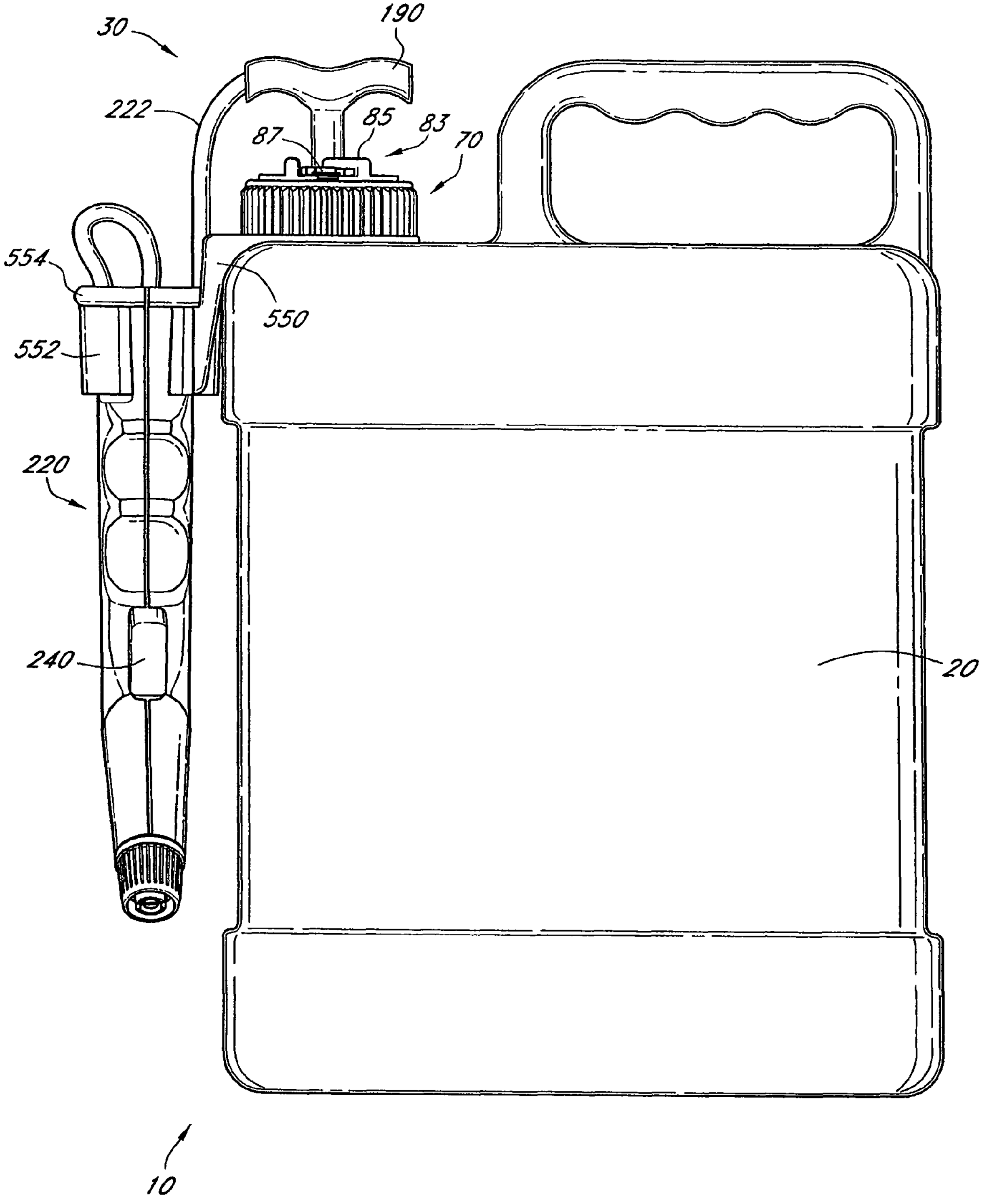
FIG. 1 is side perspective view of an example embodiment of a pump attachment attached to a chemical container.
Figure 2:
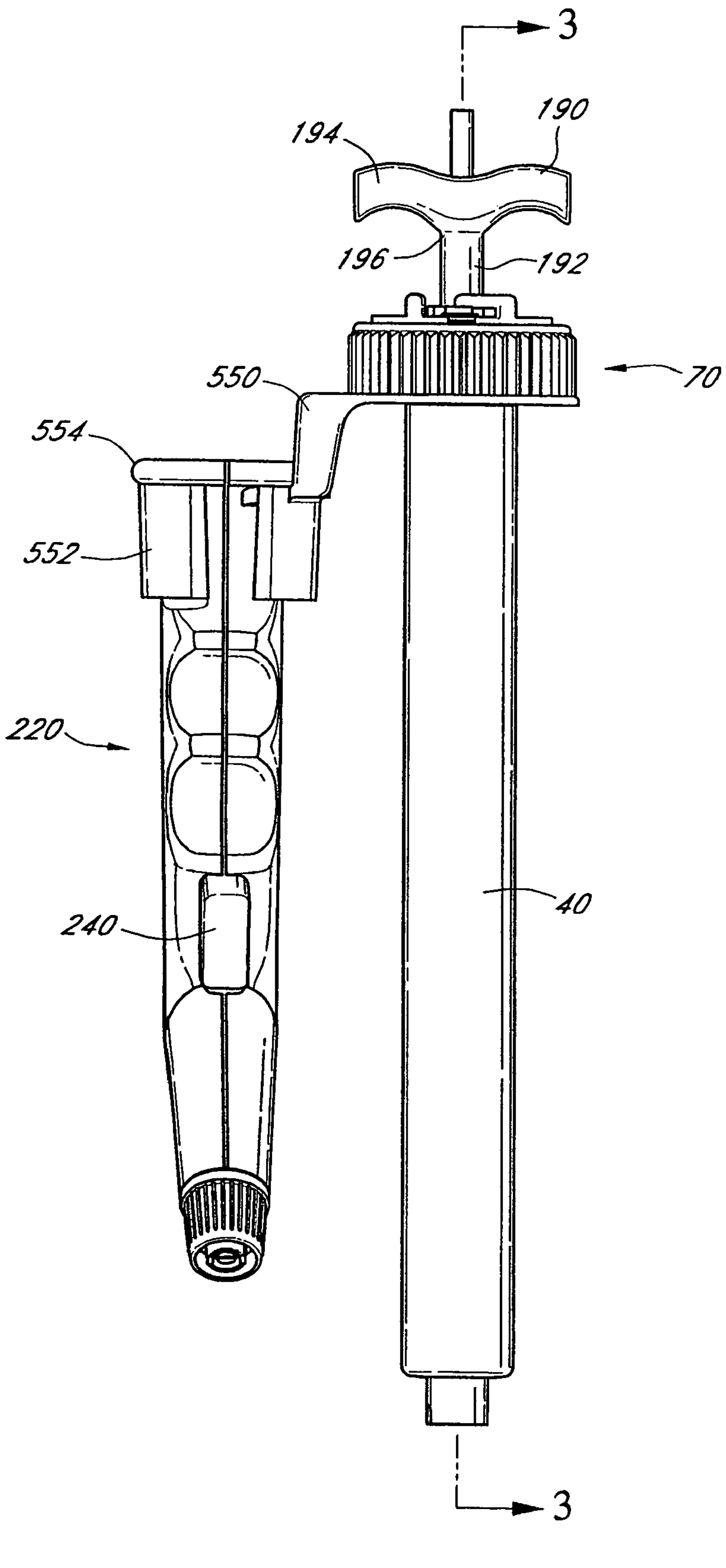
FIG. 2 is side view of the pump attachment of FIG. 1.

FIG. 1 illustrates assembly 10 that includes a container 20 and an example embodiment of a pump attachment 30, which is also shown in FIG. 2. The container 20 defines an internal space or reservoir (not shown) for storing a chemical.

Figure 3:
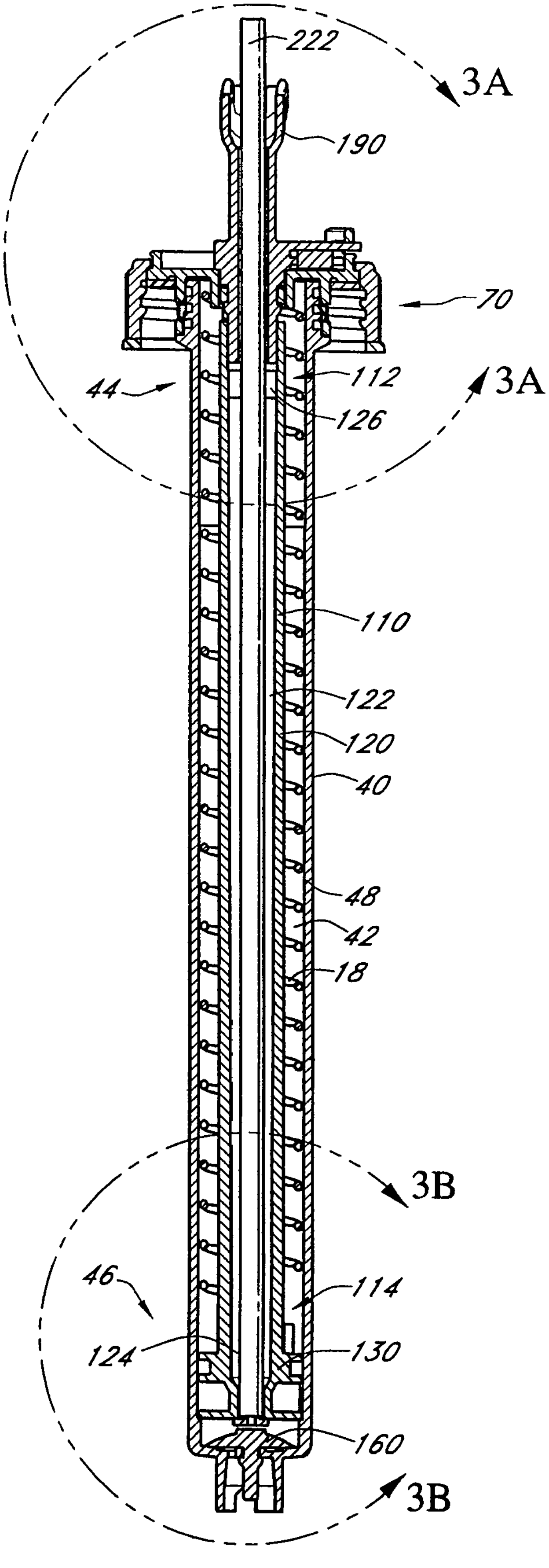
FIG. 3 is a cross-sectional view taken along line 3-3 of FIG. 2.

With reference to FIGS. 1-3, the attachment 30 includes a body 40, which is inserted into the container through a port or opening. The attachment 30 is secured to the container 20 by a threaded coupler 70. The attachment 30 further includes a shaft 110 which, in the illustrated embodiment, is integrally formed with or connected to a piston 130. A handle 190 is mounted on or integrally formed with the shaft 110. Tubing 222, which will be described in more detail below, extends between the body 40 and a wand or spray nozzle 220. The nozzle 220 includes a release valve (described below), which controls the flow of fluid through the spray nozzle 220 and an actuator 240 for controlling the release valve.

Figure 3A:
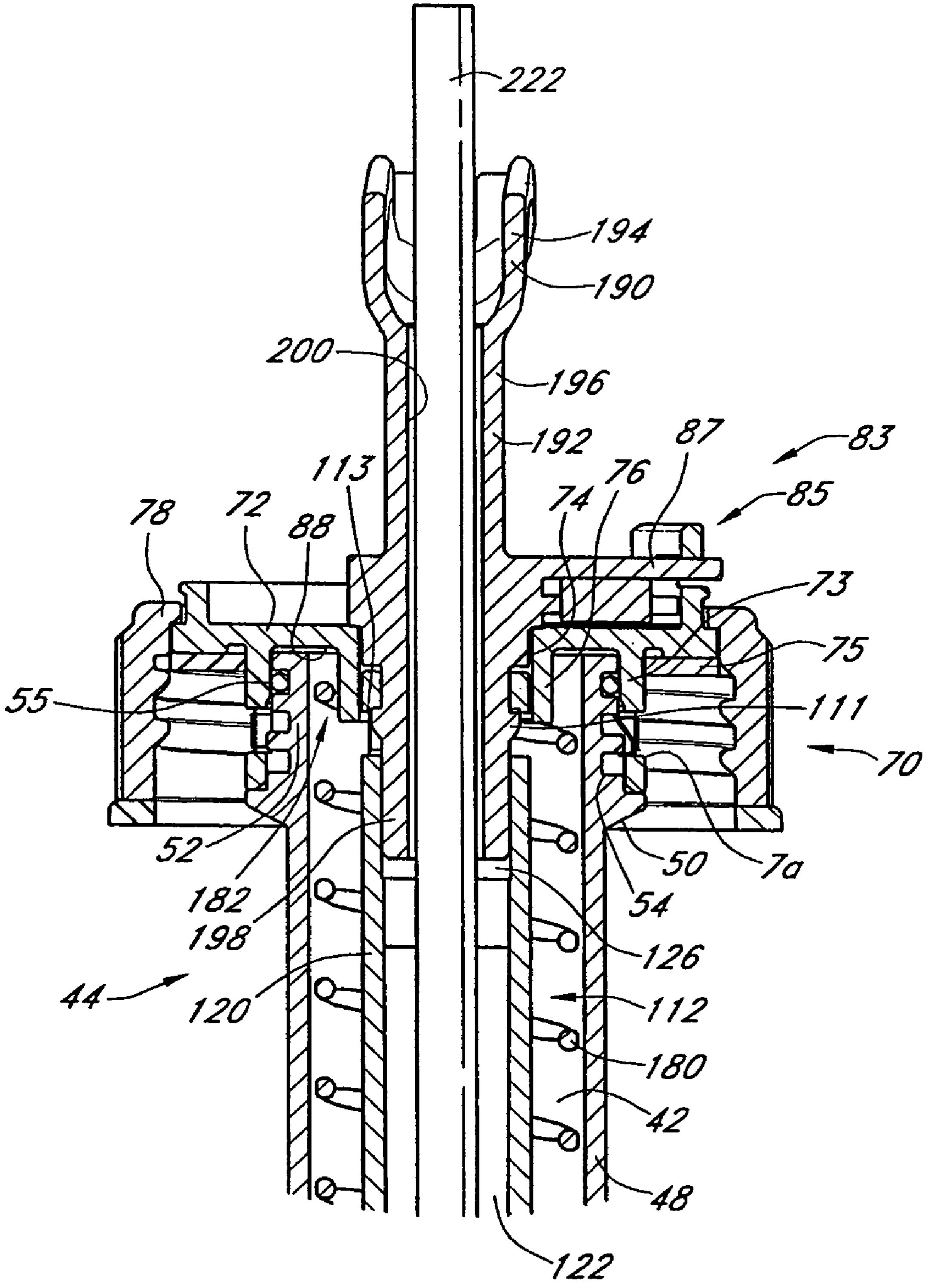
FIG. 3A is an enlarged view of an upper portion of FIG. 3.
Figure 3B:
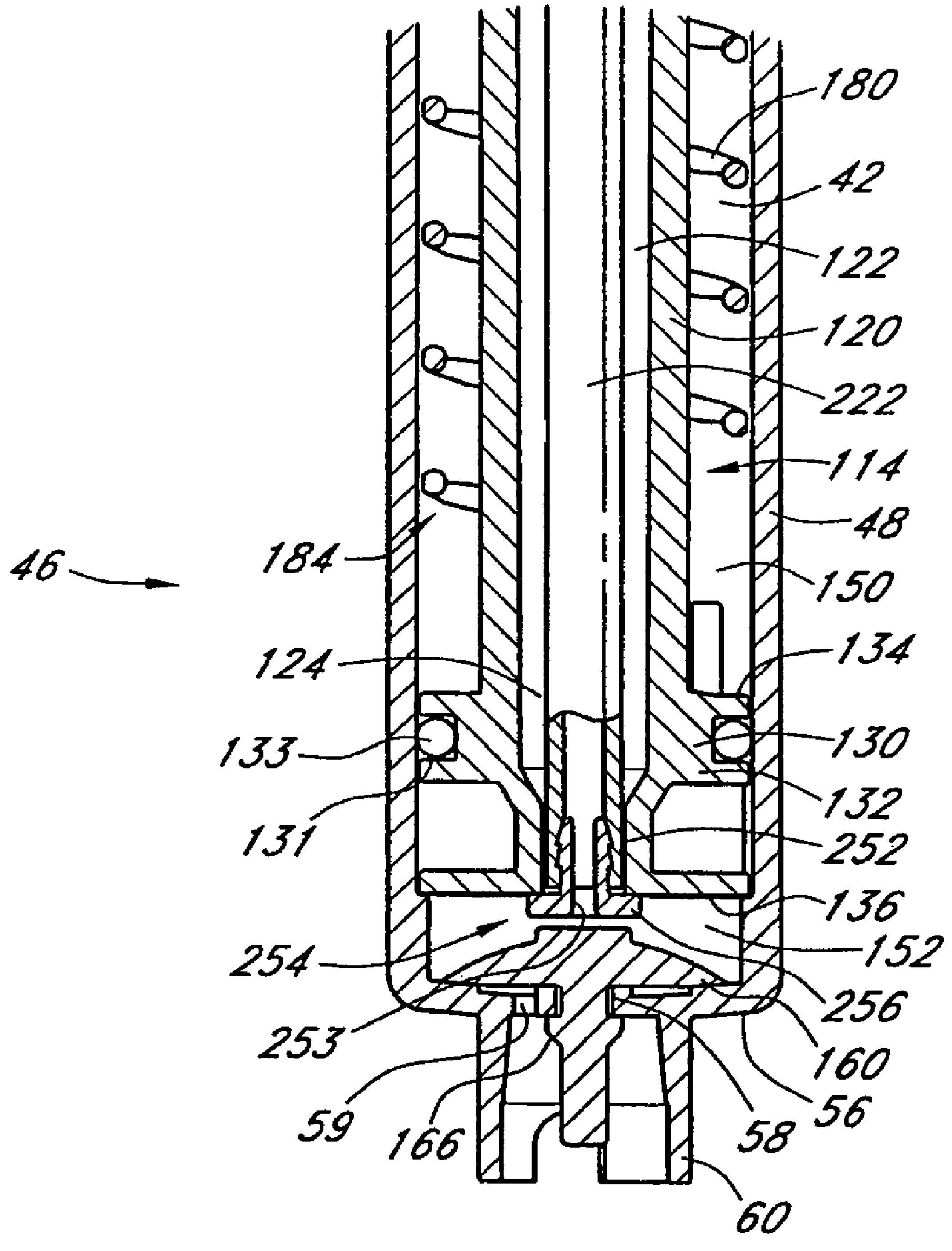
FIG. 3B is an enlarged view of a lower portion of FIG. 3.

With reference to FIGS. 2-3B, the body 40 of the attachment 30 will now be described in detail. The body 40 defines an internal chamber 42. The body 40 includes first or upper end 44, a second or lower end 46 and a cylindrical internal wall 48. As seen in FIG. 3A, The upper end 44 of the body 40 includes an outwardly tapering portion 50 and an upper cylindrical flange 52, provided with a recess 54 for receiving an O-ring 55. As seen in FIG. 3B, the lower end 46 of the body 40 is provided with an annular overhanging lip 56, which defines an opening 58 and a depending flange 60 extending downward from the annular lip 56 surrounding the opening 58.

Figure 4:
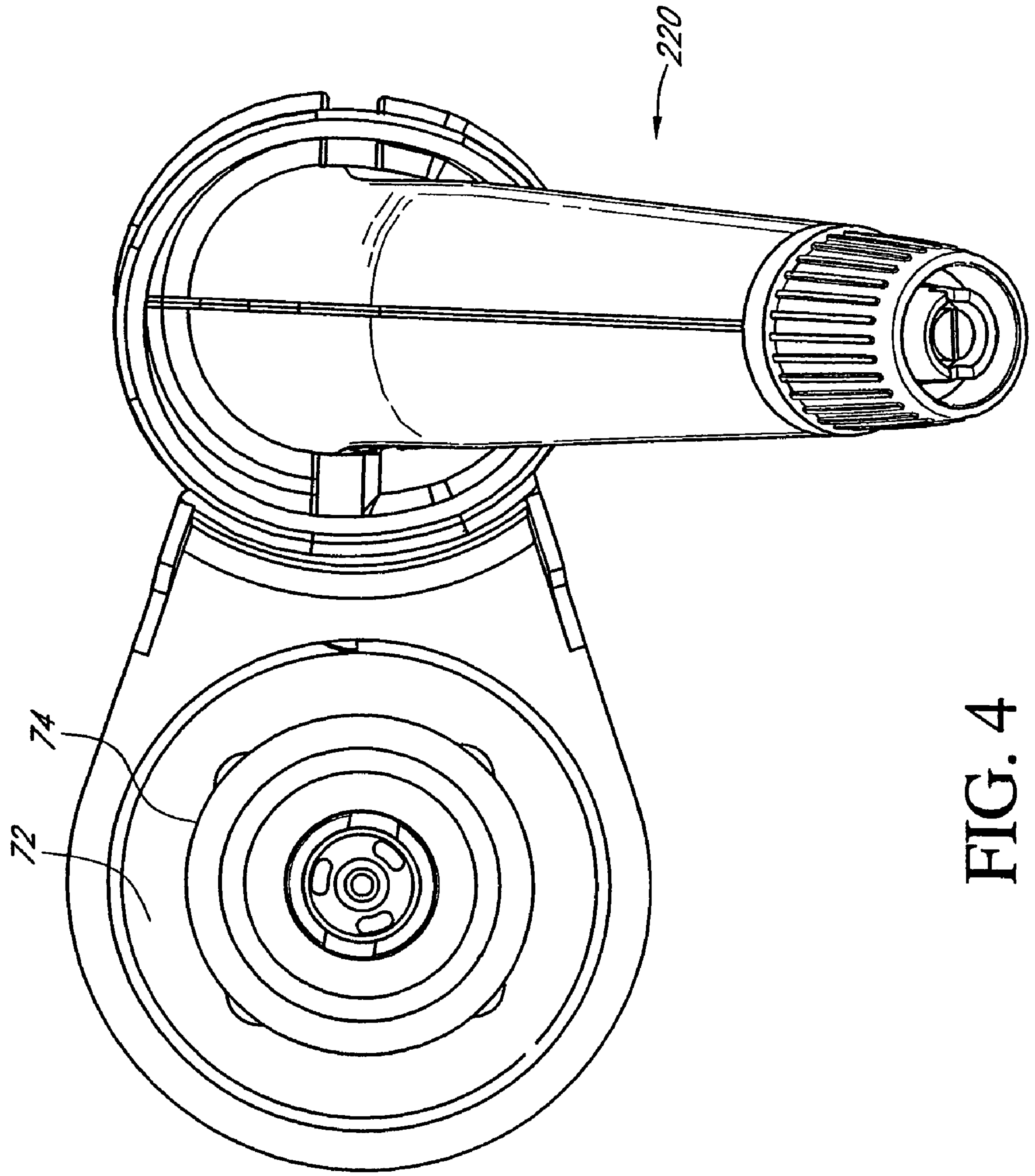
FIG. 4 is bottom view of the pump attachment of FIG. 1.

The coupler 70 (see FIGS. 3A and 4) includes a disk-shaped cap 72 that includes an downwardly projecting flange 76, which partially defines a central aperture 74 and fits over the shaft 110. The cap 72 also includes an annular extension 73, which is configured to fit over and around the upper cylindrical flange 52 of the body 40. In the illustrated embodiment, the annular extension 73 includes an annular opening 79 which interacts with an annular ridge 81 on the upper cylindrical flange 52 of the body 40 in a snap fit. The coupler 70 includes an annular lip 78, which fits over the cap 72. A gasket 75 is positioned between the cap 72 and the container 20. With reference to FIGS. 1 and 3A, the illustrated coupler 70 advantageously includes a handle locking mechanism 83, which comprises an annular lip 85, which interacts with a tap 87 on the handle 190 to lock the handle 190 in place.

As shown in FIG. 3, the shaft 110 has a first or upper end 112 and a second or lower end 114. In the illustrated embodiment, the upper end 112 is configured such that the handle 190 can be press-fitted into the shaft 110 (see FIG. 3A). The lower end 114 of the shaft 110 advantageously defines the piston 130 (see FIG. 3B). In modified embodiments, the piston 130 can be coupled to the shaft 110. In the illustrated embodiment, the piston 130 includes a recess 131 for receiving a sealing member 133 (e.g., an O-ring). The piston 130 includes a body 132 having a top 134 and bottom 136. In the illustrated embodiment, the shaft 110 includes an internal wall 120 which defines a channel 122 having a lower inlet end 124 and an upper outlet end 126. In a modified embodiment, the shaft 120 may be formed from a one or more elongated members that couple the handle 190 to the piston 130. In such an arrangement, the shaft 110 may not define a channel 122 and/or the channel 122 may be in communication with the internal chamber 42. Advantageously, the shaft 110 provides a relatively rigid connection between the piston 130 and the handle 190.

The piston 130 divides the internal chamber 42 of the body 40 into a first or upper portion 150 and a second or lower portion 152. See FIG. 3B. Mounted within the opening 58 of the body 40 is the inlet or check valve 160. One or more openings 59 are provided in the annular overhanging lip 56 under the check valve 160. The check valve 160 permits the flow of fluid through the one or more openings 59 into the lower portion 152 while preventing the flow of fluid out of the internal chamber 42 through the one or more openings 59. A lower nipple 166 secures the check valve 160 in place.

With continued reference to FIGS. 3A and 3B, a biasing member 180, such as a helical spring, has a first or upper end 182, which is seated in an outer annular spring groove 88 formed in the cap 72. A second or lower end 184 of the biasing member is seated on the top of 134 of the piston 130.

With particular reference to FIGS. 2 and 3A, the handle 190 is mounted on the upper end 112 of the shaft 110. The handle includes a vertical stem 192 and a grip or horizontal portion 194. The horizontal portion 194 is desirably integrally formed with an upper end 196 of the stem 192. In the illustrated embodiment, the lower end 198 of the stem is press-fitted into the upper end 112 of the shaft 110 and secured by the engagement of an annular ridge 111 formed on the lower end 198 of stem 192 with an annular opening 113 formed on the upper end 112 of the shaft 110. In modified embodiments, other configurations may be used to connect the shaft 110 to the handle 190. For example, the shaft 110 and handle 190 may be integrally formed into a single piece or connected by a threaded arrangement. As shown in FIG. 3A, an internal channel 200 desirably extends through the horizontal portion 194 and the stem 192 so as to be communication with the channel 122 defined by the piston shaft 120.

The tubing 222 defines a chemical flow path that is in fluid communication with the lower portion 152 of the internal chamber 42. Advantageously, the tubing 222 extends continuously through the handle 190 and is coupled to the piston 130. In the illustrated embodiment (see FIG. 3B), the piston 130 includes an inner bore 252, which extends from the upper surface 134 to the lower surface 136. The distal end of the tubing 222 extends into the inner bore 252 and is press-fitted onto a plug 254, which also includes an inner bore 253. The plug 254 extends through the bore 252 and includes a radial flange 256, which contacts the lower surface 136 of the piston 130. In this manner, the tubing 222 is securely coupled to the piston 130 and the tubing 222 is prevented from being pulled out of the container 20 through the handle 190. The plug 254 may include series of annular ridges for securely retaining the surrounding tubing 222 in place. The tubing 222 is placed in fluid communication with the lower portion 152 of the internal chamber 42 through the inner bore 253 of the plug 254. Those of skill in the art will recognize that in modified embodiments other configurations may be used for placing the tubing 222 in fluid communication with the lower portion 152 of the internal chamber 42 and/or coupling the tubing 222 to the piston 130. For example, in one embodiment, the distal end of the tubing 222 may be press-fitted into the inner bore 252 piston and further secured by adhesives and/or annular ridges provided on the bore 252. In such an embodiment, the plug 254 may be eliminated. In other embodiments, the connection between the piston 130 and the tubing 222 may be made at or near the upper surface 134 of the piston.

Figure 5:
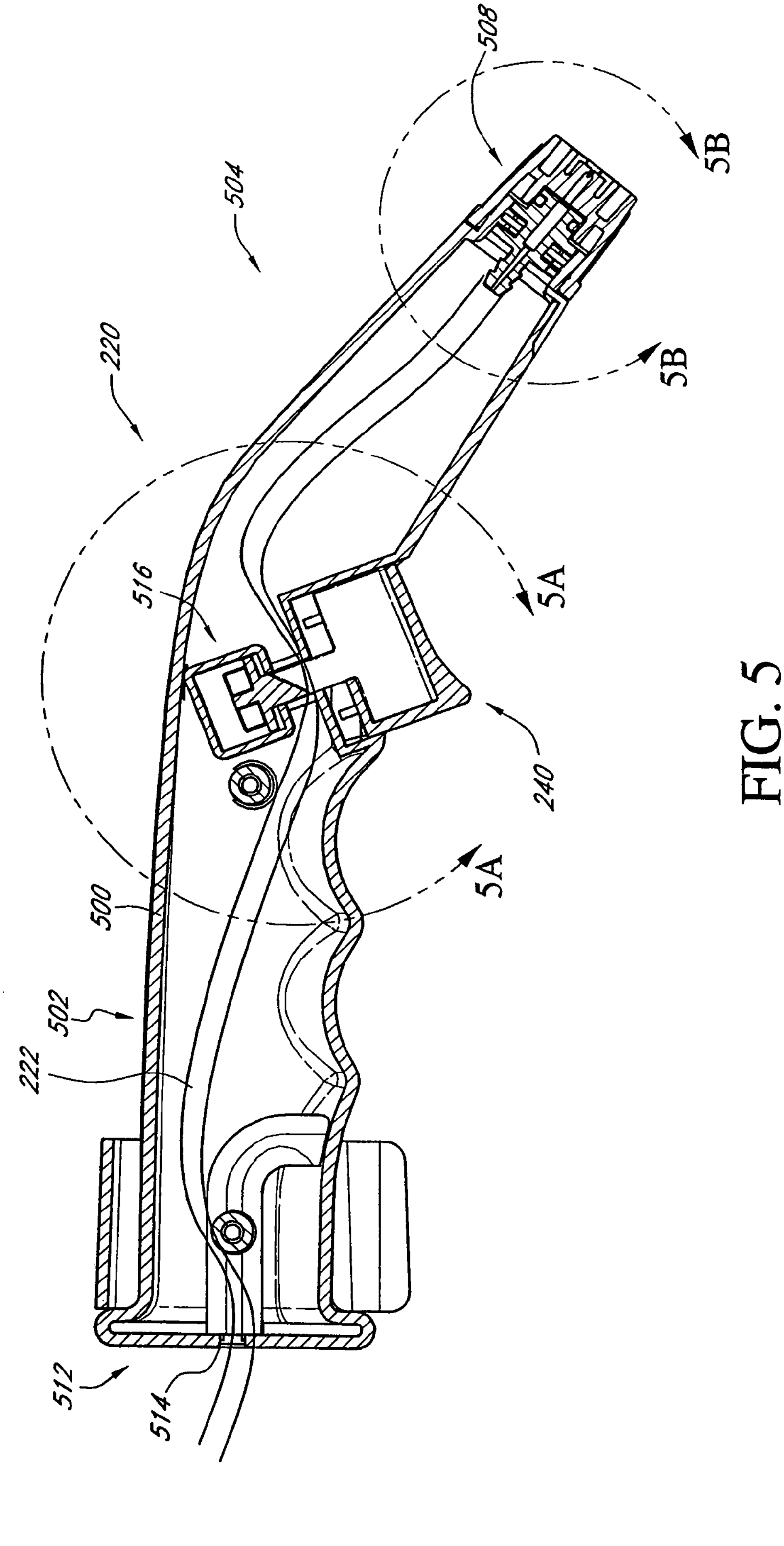
FIG. 5 is a cross-sectional view of a spray nozzle taken along line 5-5 of FIG. 2.

With reference now to FIGS. 2 and 5, the wand or spray nozzle 220 will now be described in detail. The spray nozzle 220 includes a body or housing 500, which defines a generally cylindrical grip portion 502, and a discharge end portion 504 that curves away from the cylindrical grip portion 502. The body 500 is advantageously configured such that spray nozzle 220 can be held in one hand by a user. A discharge nozzle 508 (see also FIG. 5B) is coupled to the distal end of the spray nozzle 220 and defines an internal channel 509, which terminates at a discharge outlet 510 through which the chemical is discharged from the spray nozzle 220.

In the illustrated embodiment, the proximal end 512 of the body 500 includes an inlet opening 514 for receiving the tubing 222. The tubing 222 advantageously continuously extends through the body 500 and through a valve 516, which will be described in more detail below. The valve 516 is controlled by the actuator 240, which is located on the underside of the spray nozzle 220.

The tubing 222 advantageously also extends continuously from the valve 516 to the discharge nozzle 508. As seen in FIG. 5B, In the illustrated embodiment, the discharge nozzle 508 is formed by a first piece 518 that defines the portion of the internal channel 509 which forms the discharge outlet 510. The first piece 518 may be coupled to the body 500 in a variety of arrangements. In the illustrated embodiment, the body includes a annular notch 519 which the first piece 518 engages in a snap fit. In a modified embodiment, the first piece is threaded onto the body 500. The discharge nozzle 508 also includes an inner member 520, which defines the portion 511 of the internal channel 509 that is in fluid communication with the tubing 222. In the illustrated embodiment, the inner member 520 includes a stem 521 that may be press-fitted into the tubing 222 so as to place the tubing in fluid communication with the internal channel 509 and the discharge outlet 510. Desirably, the stem 521 has a series of annular ridges for securely retaining the surrounding tubing 222 in place. The inner member 520 advantageously holds the tubing 222 in place and prevents it from being inadvertently withdrawn from the nozzle 220. Those of skill in the art will recognize that in other embodiments different configuration may be used to connect to couple the tubing 222 to the discharge nozzle 508 and/or place the tubing in fluid communication with the discharge outlet 510. For example, in one modified arrangement, the tubing 222 can be press-fitted into a bore formed in the inner member 520 and further secured via adhesives or annular ridges.

With continued reference to FIG. 5B, the portions of the internal channel 509 in the first piece 518 and the inner member 520 may be connected in a variety of manners. In the illustrated embodiment, the inner member 520 includes a plug 527 that can be inserted into a recess 523 formed in the first piece 518. An O-ring 524 may be placed between the plug 527 and the recess 523 so as to seal the connection. In modified embodiments, the discharge nozzle may be formed from a single piece or more than two pieces. In other embodiments, the tubing 222 may extend through the discharge nozzle 508 and form, at least partially, the discharge outlet 510.

In the illustrated embodiment, the tubing 222 is coupled to the piston 130 and the discharge nozzle 508 and extends continuously between these two components. In modified embodiments, the tubing 222 may be coupled to the piston 130 and extend continuously through the handle 190 and/or the tubing 222 may extend continuously from the inlet opening 514 of the spray nozzle 220 through the valve 516 and be coupled to the discharge nozzle 508 and/or extend to the discharge outlet 510. In yet another embodiment, the tubing 222 may extend continuously from a point upstream of the valve 516 to a point downstream of the valve 516. In still yet another embodiment, the tubing 222 is coupled to the piston and extends continuously to spray nozzle 220. These embodiments and various combination and sub-combinations thereof advantageously reduce the number of sealing components (e.g., O-rings and sealing members) required to manufacture the attachment 30. Similarly, it can reduce tolerance issues, which would otherwise be involved in linking a series of mating components. In this manner, these embodiments may dramatically reduce the costs of manufacturing and assembly the attachment 30. In the embodiments, in which the tubing 222 is divided into two or more portions, the portions can be connected via plugs with internal bores or a combination of O-rings and other components (e.g., fittings) as will be apparent to those of skill in the art.

The valve 516 will now be described in detail with reference to FIG. 5A and FIGS. 6A-D. The actuator 240 positioned at least partially within a housing 530, which, in the illustrated embodiment, is formed in the body 500. The illustrated actuator 240 comprises a horizontal base member 239, a pair of side walls 241*a*, 241*b* and a front wall 241*c*. The actuator 240 is coupled to a stem 532 which is formed from a pair spaced a part leg members 533*a*, 533*b* which extend from the side walls 241*a*, 241*b* of the actuator 240. A pinching member 534 is positioned between the leg members 533*a*, 533*b*. As seen in FIG. 6D, the pinching member 534 defines a slanted pinching surface 535. The leg members 533*a*, 533*b*, the pinching surface 535 and the actuator 240 define an opening 537 (see FIG. 6B). A distal stop 539 is attached to the distal end of the leg members 533*a*, 533*b*. Advantageously, the distal stop 539 has a cross-sectional diameter that is larger than the cross-sectional diameter of the leg members 533*a*, 533*b*. A spacing support 541 extends distally from the distal stop 539. In the illustrated embodiment, the spacing support 541, comprises a pair of support members arranged perpendicularly to each other.

Figure 5A:
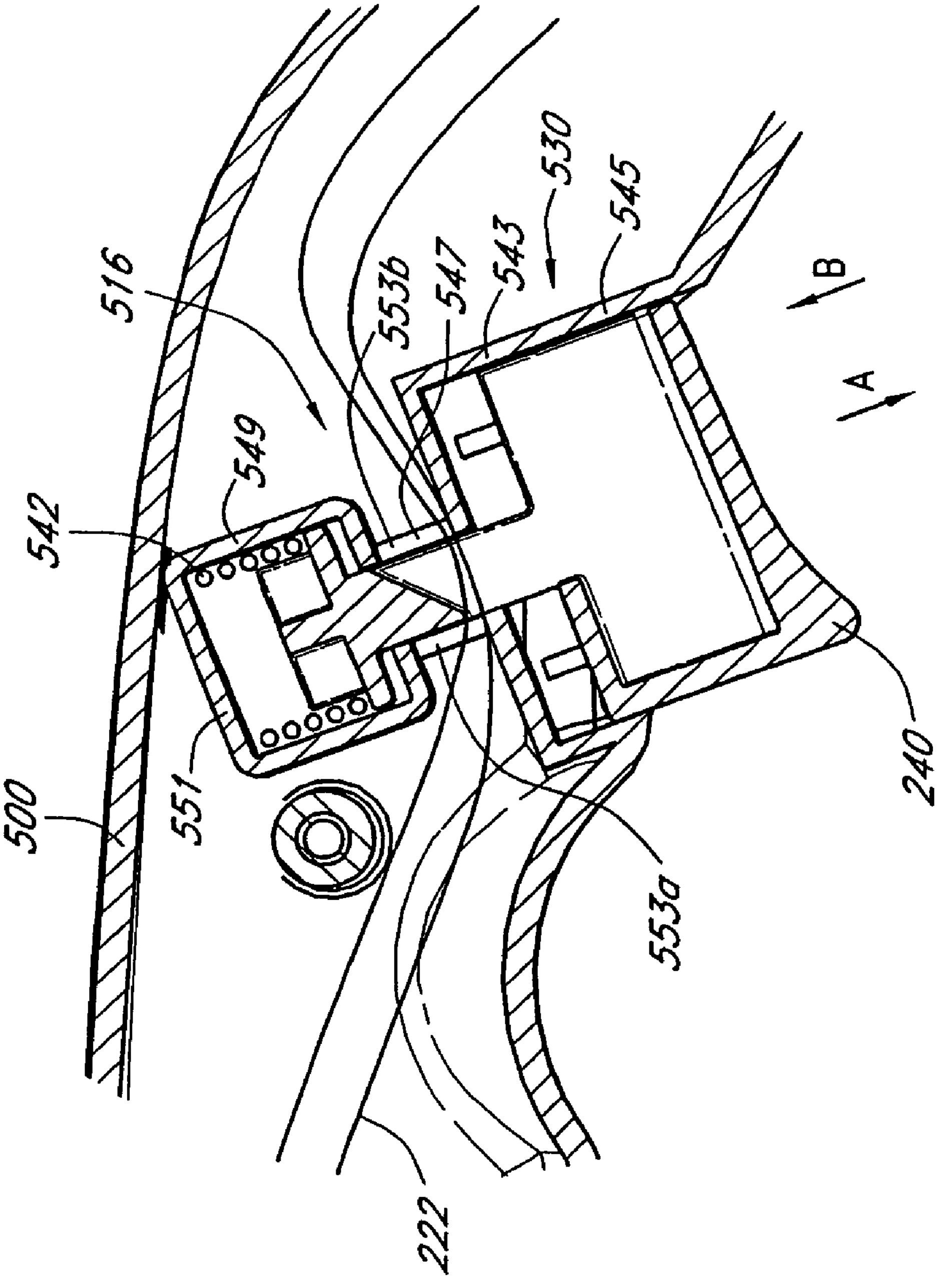
FIG. 5A is an enlarged view of the central portion of the spray nozzle of FIG. 5.
Figure 5B:
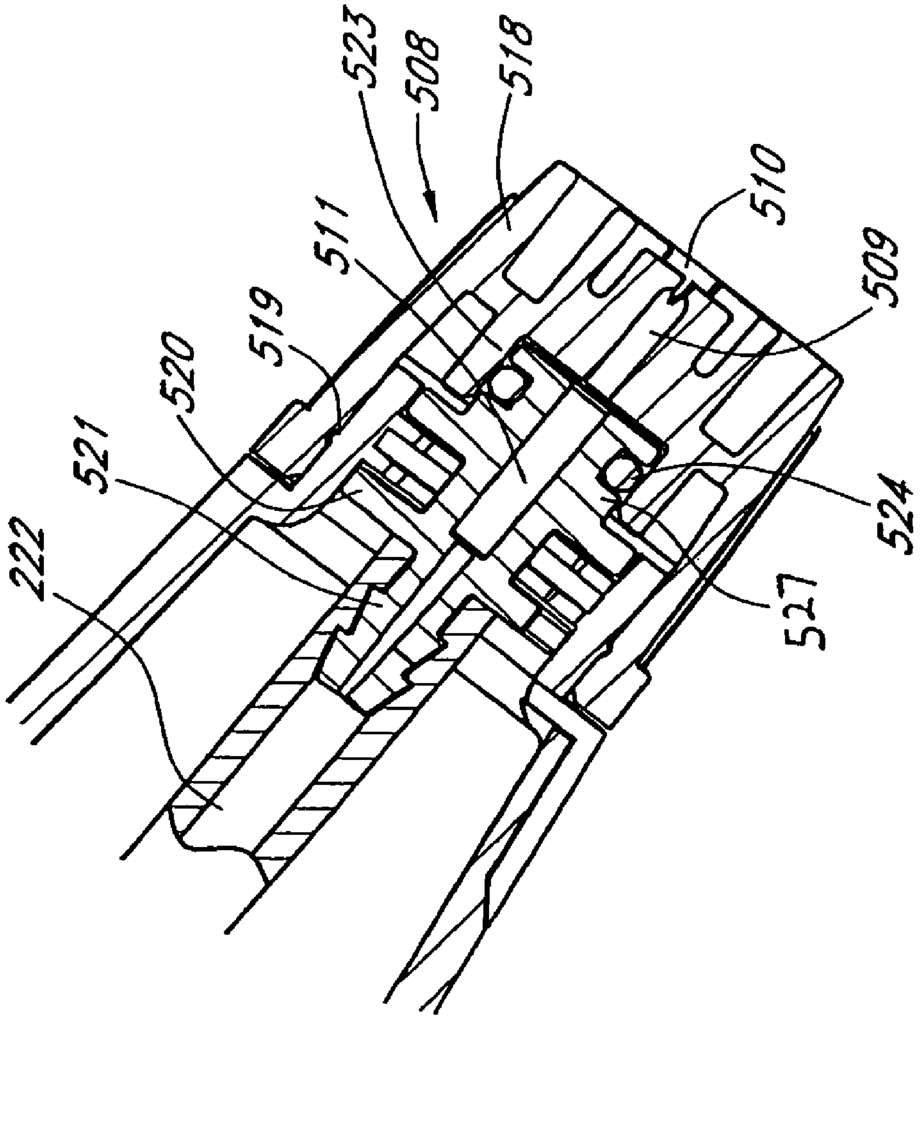
FIG. 5B is an enlarged view of the tip of the spray nozzle of FIG. 5.
Figure 6A:
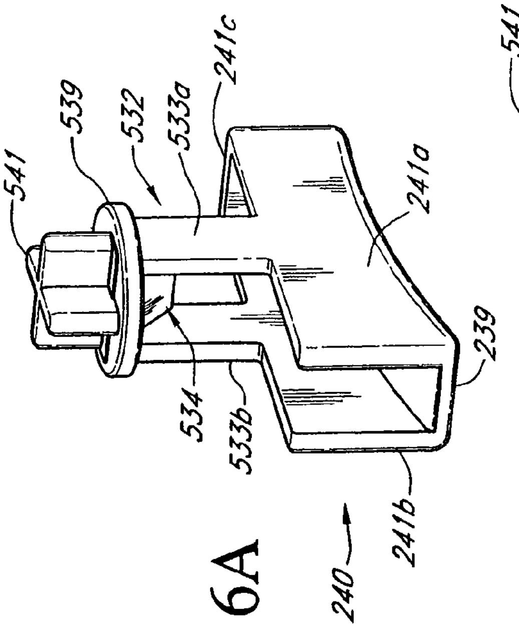
FIG. 6A is a top perspective of an actuator of the spray nozzle.
Figure 6B:
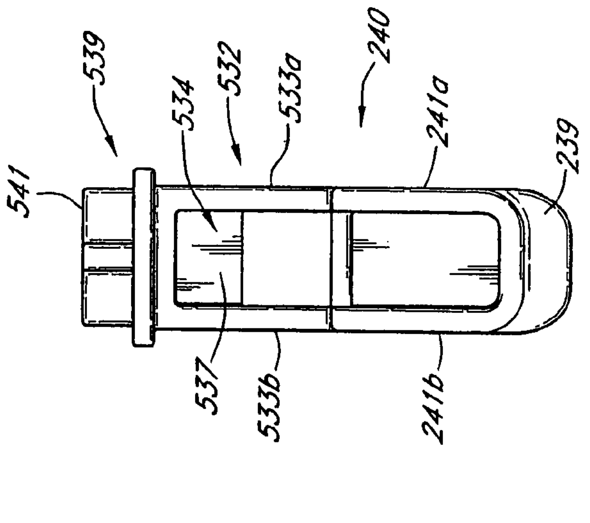
FIG. 6B is a front view of the actuator of FIG. 6A.
Figure 6C:
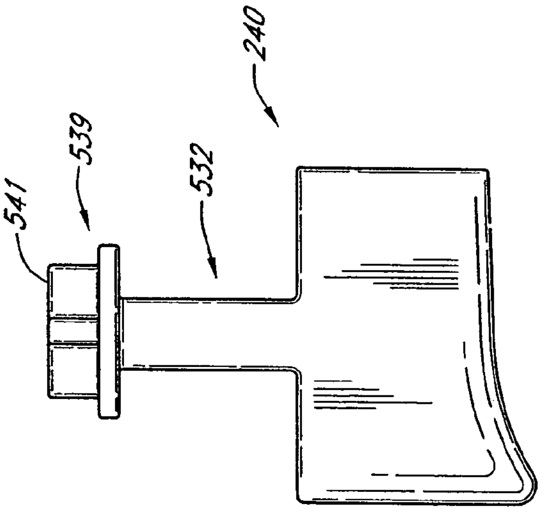
FIG. 6C is a side view of the actuator of FIG. 6A.
Figure 6D:
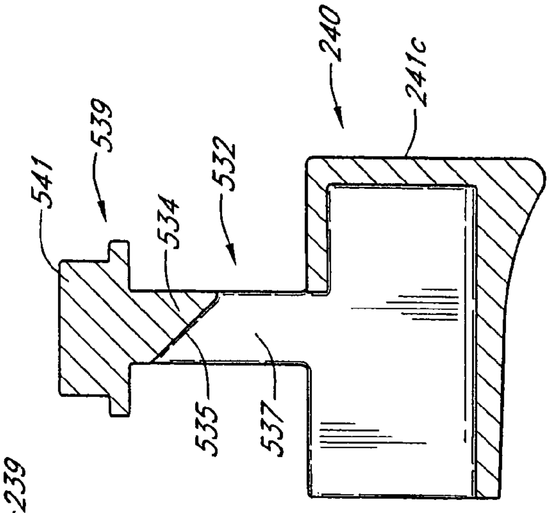
FIG. 6D is a cross-sectional view of the actuator of FIG. 6A taken along line 6D-6D.

With reference to FIG. 5A, the housing 530 generally comprises side wall 543, which defines a first bore 545, a second bore 547, and a third bore 549. In the illustrated embodiment, the first bore 545 has a diameter that is larger than the third bore 549, which has a diameter larger than the second bore 547. The third bore 549 is closed at a distal end by a horizontal member 551. When the actuator 240 is positioned within the housing 530, the opening 537 is positioned at least partially within a second bore 547. The distal stop 539, in turn, is positioned within the third bore 549 and the actuator 240 is positioned in the first bore 545. The second bore 547 includes a pair of passages 553*a*, 553*b*, which form openings on opposite sides of the second bore 547.

With continued reference to FIG. 5A, the tubing 222 extends through the passages 553*a*, 553*b* in the second bore 547 and through the opening 537 between the leg members 533*a*, 533*b* and the pinching member 534. A biasing member 542, such as a helical spring, is placed within the third bore 549 between the distal stop 539 and the horizontal member 551. In this manner, the biasing member 542 biases the actuator 240 in the direction of arrow A of FIG. 5A. The actuator 240 his held in place by the distal stop 539, which cannot move into the second bore 547. In this first position, which is illustrated in FIG. 5A, the tubing 222 is compressed between the pinching surface 534 and the passage 553*a* in the second bore 547. As such, the tubing 222 is "pinched closed" and chemical cannot flow though the tubing 222 and the valve 516. The spray nozzle 220 is therefore closed and the chemicals from the container cannot flow to the discharge outlet 510. To open the spray nozzle 220, the user depresses the actuator 240 in the direction of arrow B of FIG. 5A against the force of the biasing member 542. In this manner, the tubing 222, which extends through the second bore 547 is no longer "pinched" between the pinching surface 534 and the passage 553*a*. Thus, chemicals can flow through the valve 516 to the discharge nozzle 508. Of course, those of skill in the art will recognize that in modified embodiments other configurations may be used for "pinching close" the tubing 222 in the spray nozzle 220. In addition, in embodiments in which the tubing 222 does not extend through the valve 516 other types of valves can be used such as the valves disclosed in U.S. Pat. No. 5,918,782, which is hereby incorporated by reference herein.

The tubing 222 in the illustrated embodiment generally comprises a tubular wall member 223, which defines a chemical path 225 through which chemicals from the container can flow. Advantageously, the tubing 222 may be made of a flexible, light weight material with substantially uniform properties throughout the length of tubing 222 used in the attachment 30.

With to reference back to FIGS. 1 and 2, the illustrated attachment advantageously includes a holder 550 for holding the sprayer nozzle 220 during storage or shipment. In the illustrated arrangement, one end of the holder 550 is mounted between the container 20 and the coupler 70. The other end of the holder 550 comprises a cylindrical body 552 through which the nozzle 220 can be inserted. As shown in FIG. 1, the proximal end of the nozzle 220 advantageously includes an protrusion or enlarged portion 554, which prevents the nozzle 220 from falling through the cylindrical body 552.

Figure 7:
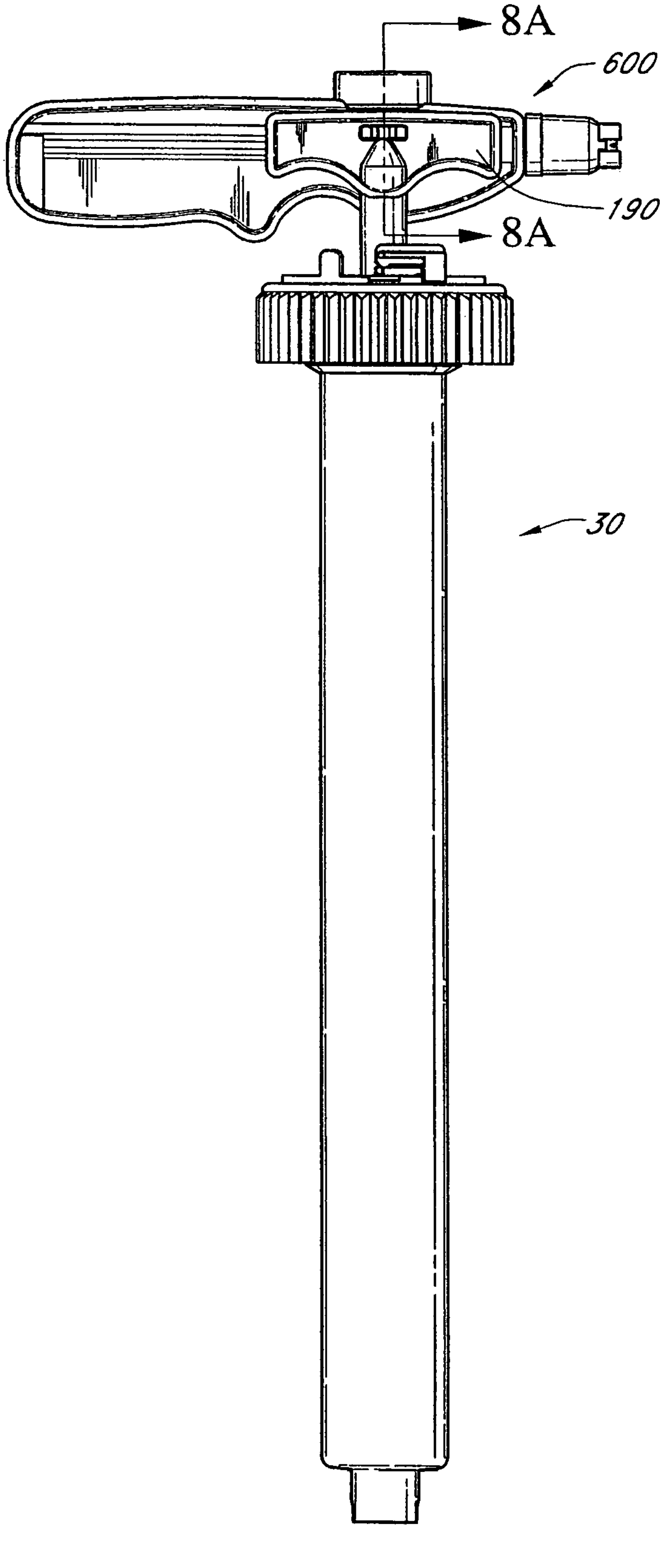
FIG. 7 is a cross-sectional view of another example embodiment of a pump apparatus.
Figure 8A:
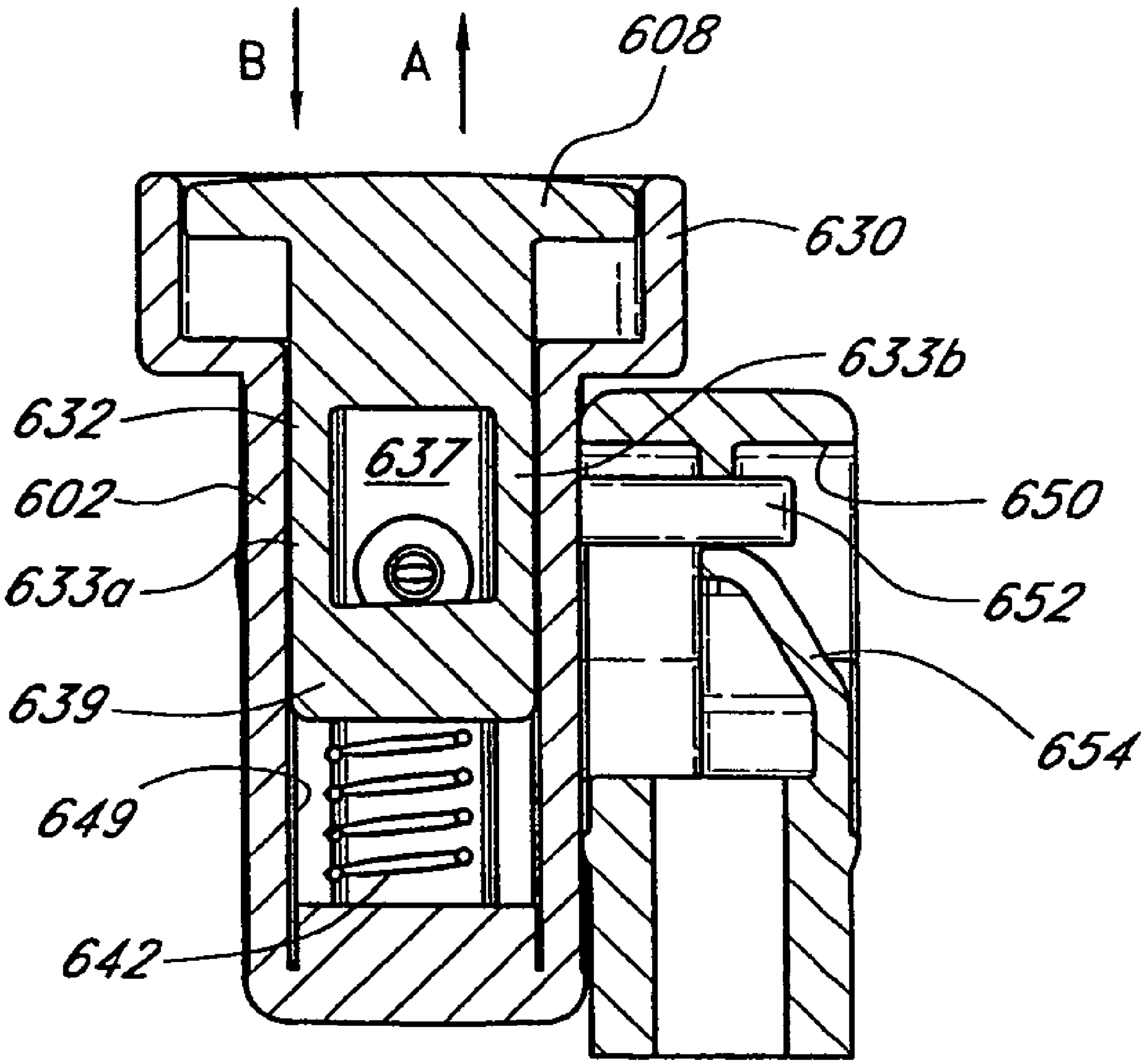
FIG. 8A is a cross-sectional view taken through line 8A-8A of FIG. 7.
Figure 8B:
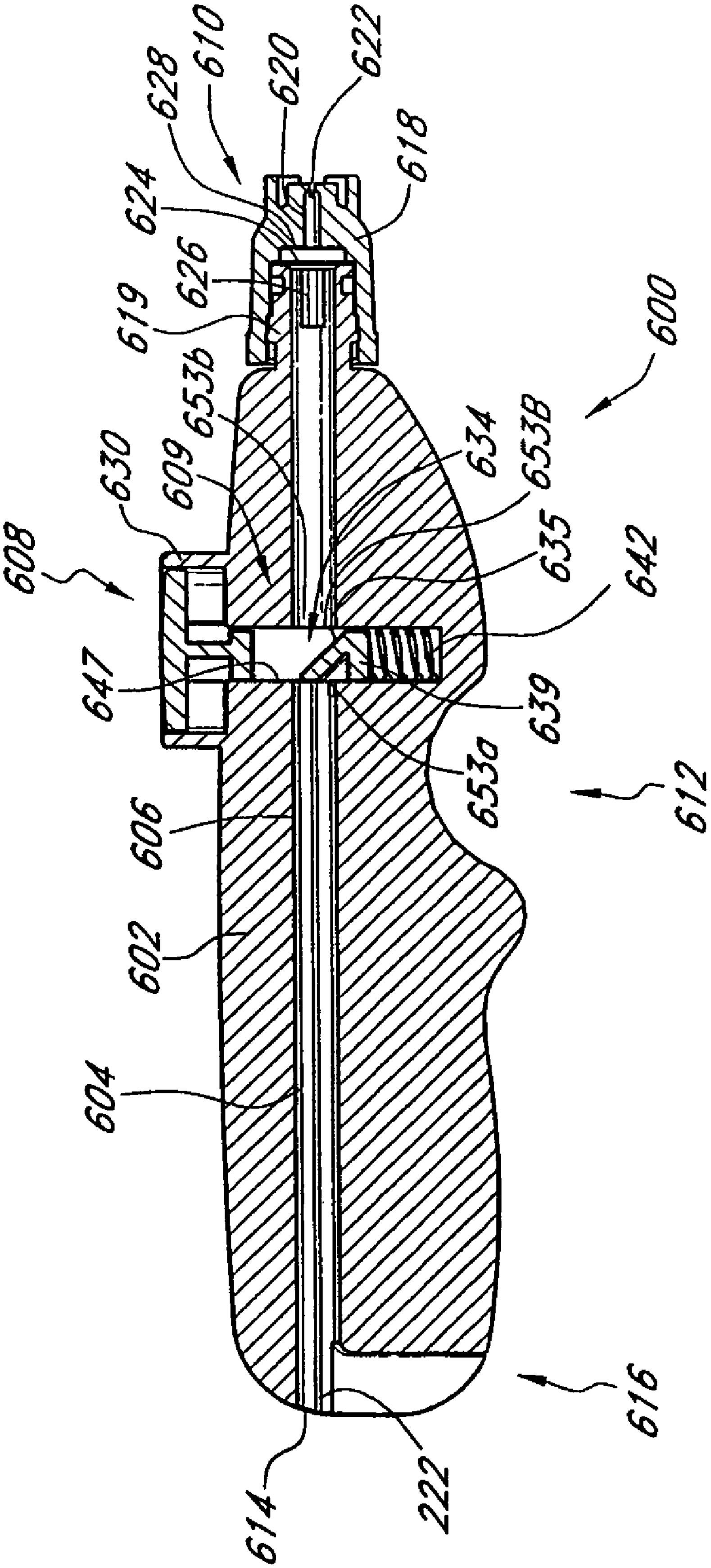
FIG. 8B is a cross-sectional view taken through line 8B-8B of FIG. 8A.

FIGS. 7-8B illustrated a modified embodiment of a spray nozzle 600. In this embodiment, the sprayer 600 comprises a body 602, which includes an internal pathway 604 defined by a channel 606, an actuator 608 for controlling a release valve 609 and a discharge nozzle 610. The body 602 advantageously configured such that sprayer 600 can be held in one hand by a user. In the illustrated embodiment, the body 602 defines a recess 612 for the index finger of the user. In the illustrated embodiment, the channel 606 defines a first opening 614 at a proximal end 616 of the body for receiving the tubing 222. In the illustrated embodiment, the tubing 222 advantageously extends continuously through the spray nozzle 600, past the actuator 608 and is coupled to and in fluid communication with the discharge nozzle 610. In the illustrated embodiment, the discharge nozzle 610 includes a plug 624, which is mounted between the discharge nozzle and the body 602 and extends partially into the internal channel 604. The tubing 222 is mounted over the plug 624, which includes an internal channel or bore 626 and may include annular retention structures as described above. As mentioned above, those of skill in the art will recognize that in other embodiments different configurations may be used to connect to couple the tubing 222 to the discharge nozzle 610 and/or placing the tubing 222 in fluid communication with the discharge outlet 222 In modified embodiments, the discharge nozzle 610 may be formed from more or less pieces. In addition, the tubing 222 may extend through the discharge nozzle 610 and form, at least partially, the discharge outlet 622.

The valve 609 will now be described in detail. The actuator 608 positioned at least partially within an annular housing 630, which, in the illustrated embodiment, extends from the body 602. The actuator 608 is coupled to a stem 632, which is formed from a pair spaced a part leg members 633*a*, 633*b* that extend from the actuator 608. A pinching member 634 is positioned between the leg members 633*a*, 633*b*. As seen in FIG. 8B, the pinching member 634 defines a slanted pinching surface 635. The leg members 633*a*, 633*b*, the pinching surface 635 and a lower surface of the actuator 608 define an opening 637 (see FIG. 8A). A distal support 639 is attached to the distal end of the leg members 633*a*, 633*b*. The tubing 222 prevents the actuator 608 from being removed from the body 602.

With particular reference to FIGS. 8A and 8B, the body 602 forms a bore 649 that includes a pair of passages 653*a*, 653*b*, which form openings on opposite sides of the bore 649. The tubing 222 extends through the passages 653*a*, 653*b* in the bore 647 and through the opening 637 between the leg members 633*a*, 633*b* and the pinching member 634. A biasing member 642, such as a helical spring, is placed within the bore 649 between the distal stop 639 and a lower surface of 643 of the bore 649. In this manner, the biasing member 642 biases the actuator 608 in the direction of arrow A of FIG. 8A. In this first position, the tubing 222 is compressed between the pinching surface 634 and the passage 653*a* in the second bore 649. As such, as with the previous embodiment, the tubing 222 is "pinched closed" and chemical cannot flow though the tubing 222 and the valve 609. To open the spray nozzle 600, the user depresses the actuator 608 in the direction of arrow B of FIG. 8A against the force of the biasing member 642. In this manner, the tubing 222, which extends through the bore 649 is no longer "pinched" between the pinching surface 634 and the passage 653*a*. Thus, chemicals can flow through the valve 609 to the discharge nozzle 610. Of course, those of skill in the art will recognize that in modified embodiments other configurations may be used for "pinching close" the tubing 222 or that other types of valves can be used such as the valves disclosed in U.S. Pat. No. 5,918,782, which is hereby incorporated by reference herein.

With reference to FIGS. 7 and 8A, the spray nozzle 600 is advantageously configured such that it can be detachably coupled to the handle 190 of the pump attachment 30. In the illustrated embodiment, this is accomplished by providing the handle 190 with an opening 650, which in the illustrated embodiment is rectangular. The spray nozzle 600, in turn, includes plurality of projections 652, which is configured so as to engage a flexible arm 654 positioned in the opening 650. In this manner, the spray nozzle 600 can engage the handle 190 in a snap fit. In modified embodiments, the spray nozzle 600 include a groove or protrusion while the handle 190 includes complementary a protrusion or groove. Those of skill in the art in light of this specification will also recognize other complementary structures which can be use for detachably coupling the spray nozzle 600 to the handle 190.

Figure 9:
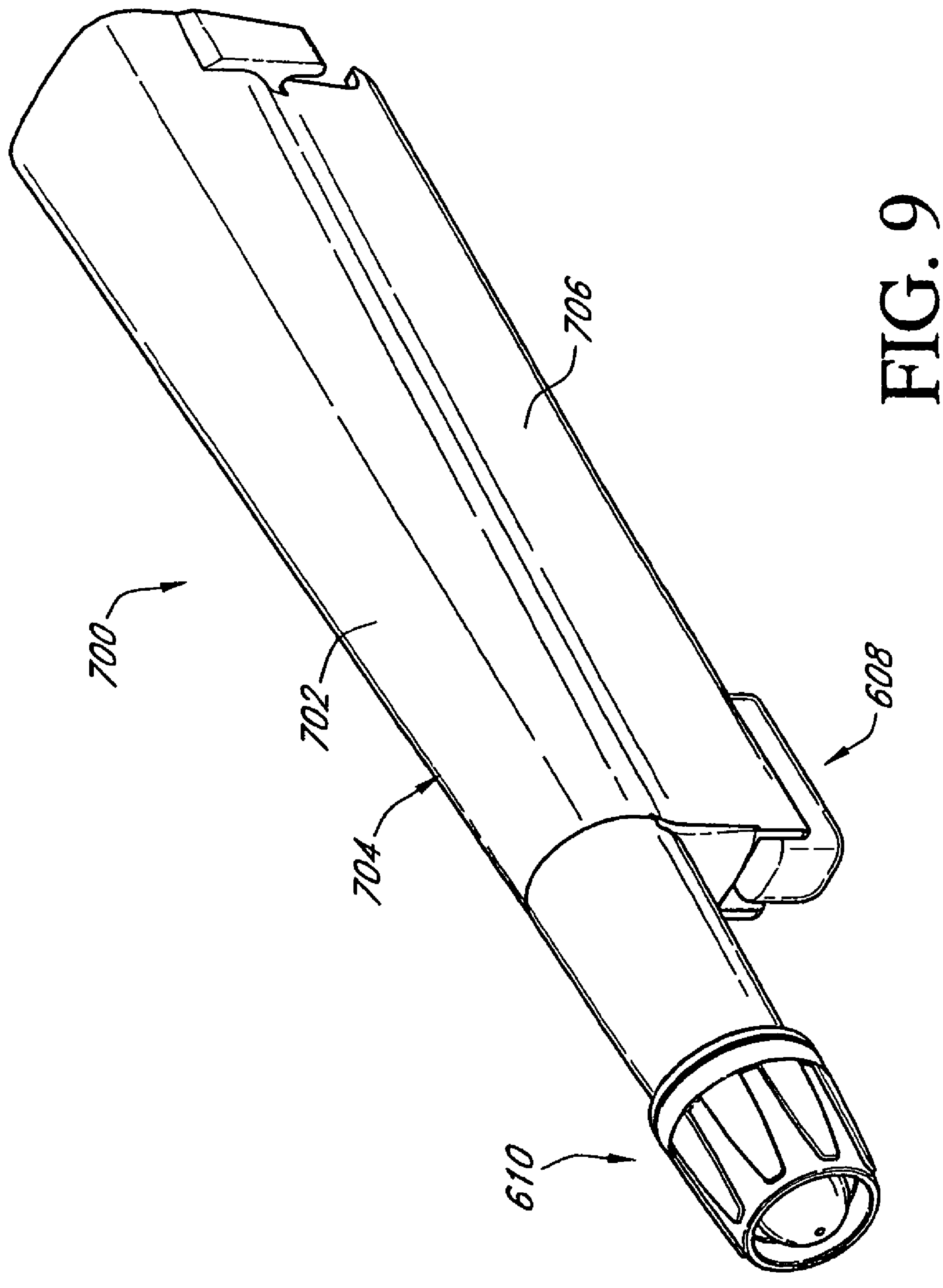
FIG. 9 is a top perspective view of an example embodiment of a spray nozzle.
Figure 10:
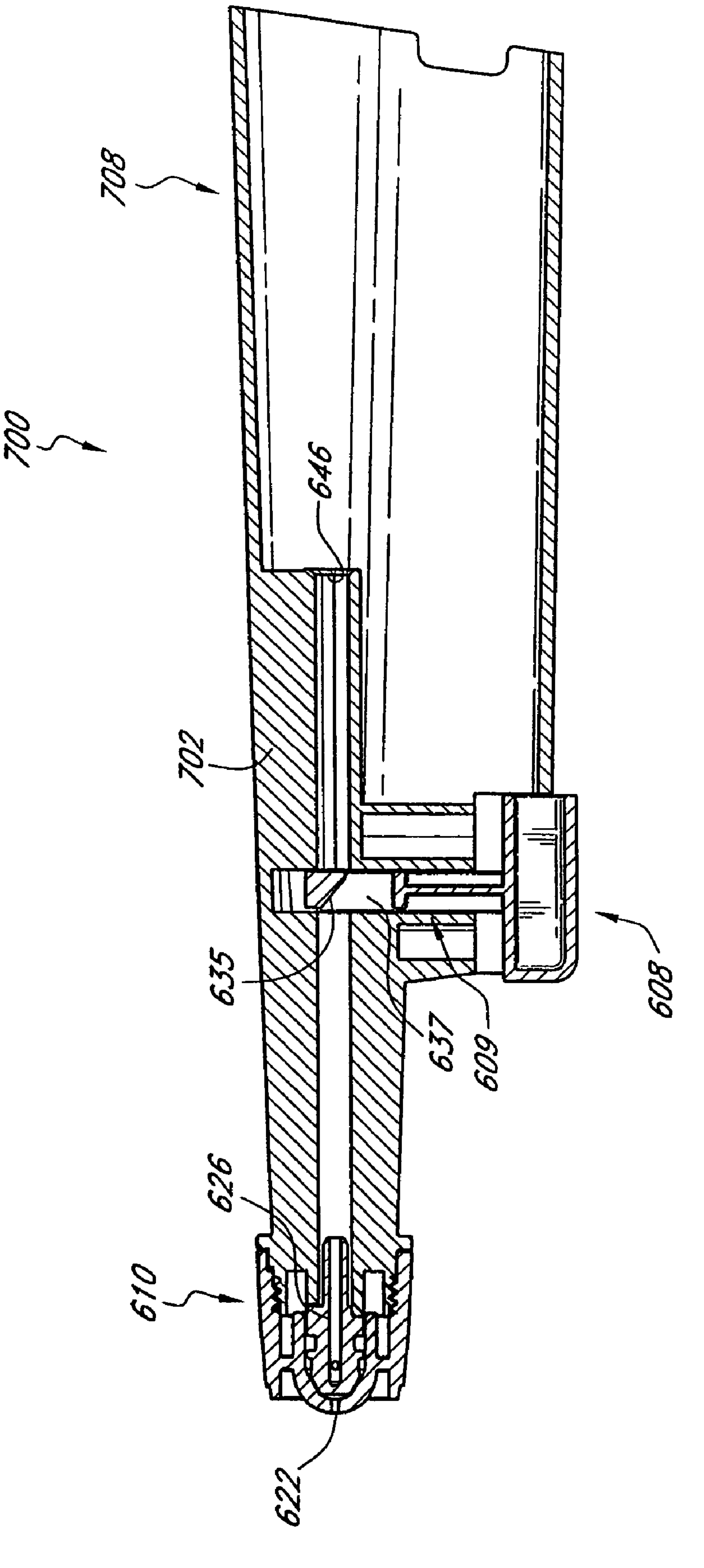
FIG. 10 is a longitudinal cross-sectional view of the spray nozzle of FIG. 9.

FIGS. 9 and 10 illustrate another exemplary embodiment of a spray nozzle 700 shown without the tubing 222. In this embodiment, components that are similar to the components of the previous embodiment have been given the same reference number. As shown in FIGS. 9 and 10, the main difference between this embodiment and the previous embodiment is the shape of the body 702 and the position of the actuator 608. The actuator 608 is positioned on the underside of the body 702. In addition, the body 702 comprises a conical main section 704 and rectangular lower portion 706, which extend beneath the conical main section. As shown in FIG. 10, the inlet opening to the internal channel is protected by a proximal portion 708 of the body 702 which extend proximally from the inlet opening 646.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof In addition, while a number of variations of the invention have been shown and described in detail, other modifications, which are within the scope of this invention, will be readily apparent to those of skill in the art based upon this disclosure. It is also contemplated that various combination or sub-combinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. A pump attachment for a container comprising:

a body defining a chamber and having a first end and a second end and a wall extending between the first end and the second end, wherein the second end comprises an annular lip defining an opening in the second end, wherein the wall and the annular lip are formed of a single piece of material;

a hollow shaft extending through an opening in the first end of the chamber and defining a piston in sealing engagement with an interior portion of the wall of the body, the piston separating the chamber into an upper portion above an upper surface of the piston and a lower portion below a lower surface of the piston;

a handle coupled to the shaft;

a check valve mounted in the opening and configured to permit the flow of fluid into the chamber and restrict the flow of fluid out of the chamber;

a biasing member between the piston and the first end of the body;

tubing fitted in the hollow shaft and extending into an inner bore of the piston; and a spray nozzle in fluid communication with the lower portion of the chamber.

2. The pump attachment of claim 1, wherein the spray nozzle further comprises:

a body defining an internal channel having an inlet end; and a discharge nozzle defining an internal bore that forms, at least in part, a discharge outlet.

3. A pump attachment for a container comprising:

a body defining a chamber and having a first end and a second end and a wall extending between the first end and the second end;

a shaft extending through an opening in the first end of the chamber and defining a piston in sealing engagement with the interior wall of the body, wherein the piston is integral with the shaft, the piston separating the chamber into an upper portion above an upper surface of the piston and a lower portion below a lower surface of the piston;

a handle coupled to the shaft;

an inlet valve at the second end of the body, the inlet valve configured to permit the flow of fluid into the chamber and restrict the flow of fluid out of the chamber;

a biasing member between the piston and the first end of the chamber;

a spray nozzle that comprises a body that defines an internal channel having an inlet end, an actuator and a discharge outlet, the actuator being coupled to a spray valve for controlling the flow of chemical from the lower portion of the chamber through the spray nozzle to the discharge outlet;

and a continuous piece of tubing which has a first end coupled to the piston and in fluid communication with the lower portion of the chamber, and a second end, which extends into the spray nozzle through the inlet end of the internal channel;

wherein the first end of the tubing is positioned within an internal bore in the piston.

4. The pump attachment of claim 3, wherein the spray nozzle comprises a discharge nozzle, which defines an internal bore that forms, at least in part, the discharge outlet.

5. The pump attachment of claim 4, wherein the second end of the tubing is coupled to the discharge nozzle.

6. The pump attachment of claim 5, wherein the second end of the tubing is coupled to the discharge nozzle by a stem that extends partially into the tubing and includes a radial flange that cooperates with the spray nozzle to prevent the tubing from being pulled out of the spray nozzle.

7. The pump attachment of claim 3, wherein the tubing extends through an internal channel formed in the handle.

8. The pump attachment of claim 3, wherein the tubing is coupled to the piston by a plug that includes a distal end that extends into the tubing and a radial flange that interacts with the lower surface of the piston to prevent the tubing from being pulled out of the chamber.

9. The pump attachment of claim 8, wherein the plug includes a second bore which places the tubing in fluid communication with the lower portion of the chamber.

10. A chemical sprayer system comprising:

a container that defines a cavity for storing a chemical to be sprayed;

a body defining a chamber and having a first end and a second end and a wall extending between the first end and the second end, the first end of the body being positioned within the cavity, and a depending flange extending downward from the second end;

a shaft extending through an opening in the first end of the chamber and defining a piston in sealing engagement with the interior wall of the body, wherein the piston is integral with the shaft, the piston separating the chamber into an upper portion above an upper surface of the piston and a lower portion below a lower surface of the piston;

a handle coupled to the piston through the shaft;

an inlet valve at the second end of the body, the inlet valve configured to permit the flow of fluid into the chamber from the cavity and restrict the flow of fluid out of the chamber;

a biasing member between the piston and the first end of the chamber;

and a spray nozzle that comprises an actuator and a discharge outlet, the actuator being coupled to a spray valve for controlling the flow of chemical from the lower portion of the chamber through the spray nozzle to the discharge outlet, the spray nozzle including a tube that extends continuously from a point upstream of the spray valve to a point downstream of the spray valve, the point upstream of the spray valve being in fluid communication with the lower portion of the chamber and the point downstream of the spray valve being in fluid communication with the discharge outlet.

11. The chemical sprayer system of claim 10, wherein when the actuator is in a first position the tubing passes through the valve substantially unobstructed and in a second position the tubing is pinched closed within the valve.

12. The chemical sprayer system of claim 10, wherein the spray nozzle comprises a body that defines an internal channel having an inlet end, the spray nozzle also comprising a discharge nozzle, which defines an internal bore that forms, at least in part, the discharge outlet.

13. The chemical sprayer system of claim 12, and wherein the tube extends continuously from the inlet end of the internal channel to the point downstream of the spray valve and is coupled to the discharge nozzle such that the tubing is in fluid communication with the internal bore.

14. The chemical sprayer system of claim 13, wherein the tubing is coupled to the discharge nozzle by a stem that extends partially into the tubing and includes a radial flange that cooperates with the spray nozzle to prevent the tubing from being pulled out of the spray nozzle.

15. The chemical sprayer system of claim 13, wherein the tube extends continuously from the inlet end of the internal channel of the spray nozzle to the chamber through a second internal channel which is formed in the handle.

16. The chemical sprayer system of claim 15, wherein the tube is coupled to the piston.

17. The chemical sprayer system of claim 16, wherein the tube extends continuously from the inlet end of the internal channel of the spray nozzle to the internal bore in the piston.

18. The chemical sprayer system of claim 13, wherein the tube extends continuously from the inlet end of the internal channel of the spray nozzle to the bore in the piston.

19. The chemical sprayer system of claim 18, wherein the tube is coupled to the piston by a plug that includes a distal end that extends into the tube and a radial flange that interacts with the lower surface of the piston to prevent the tube from being pulled out of the chamber.

20. The chemical sprayer system of claim 19, wherein the plug includes a second bore which places the tubing in fluid communication with the lower portion of the chamber.

21. The chemical sprayer system of claim 10, further comprising a fluid contained in the cavity of the container.

22. A pump attachment, comprising:

a body having a first end, a second end with an annular overhanging lip defining an opening, and a wall between the first end and the second end wherein the first end, second end, and wall define an internal chamber, wherein the wall and the annular overhanging lip are formed of a single piece of material;

a shaft positioned within at least a portion of the internal chamber, wherein the shaft defines a piston separating the internal chamber into a first portion between the piston and the first end and a second portion between the piston and the second end, wherein the piston is integral with the shaft, wherein the shaft further comprises a hollow shaft having a channel therethrough with a first shaft opening proximate the first end of the body and a second shaft opening in communication with the second portion of the internal chamber;

a check valve seated in the opening;

a biasing member between the piston and the first end of the body;

a spray nozzle in fluid communication with the second portion of the internal chamber;

tubing fitted in the channel of the hollow shaft and extending into an inner bore of the piston;

a plug comprising an inner plug bore extending into the inner bore of the piston wherein the tubing is positioned between an inner wall of the inner bore of the piston and an outer wall of the plug; and wherein the plug comprises a radial flange contacting a lower surface of the piston.

23. The pump attachment of claim 22, further comprising a container defining a reservoir and an opening into the reservoir wherein the pump attachment is secured to the container with at least a portion of the body extending into the reservoir.

24. The pump attachment of claim 22, further comprising a handle in communication with the shaft.

25. The pump attachment of claim 22, further comprising a handle integrally connected to the shaft.

26. The pump attachment of claim 22, wherein the piston comprises a piston sealingly engaged with at least a portion of the wall of the body.

27. The pump attachment of claim 22, further comprising tubing extending between the spray nozzle and the second portion of the internal chamber.

28. The pump attachment of claim 22, further comprising tubing connected between the first shaft opening and the spray nozzle.

29. The pump attachment of claim 22, further comprising tubing connected to the spray nozzle and extending through the shaft and connected to the piston.

30. A pump attachment, comprising:

a body having a first end, a second end with an annular overhanging lip defining an opening and a depending flange extending downward from the annular lip surrounding the opening in the second end, and a wall between the first end and the second end wherein the first end, second end, and wall define an internal chamber, and wherein the wall and the annular lip are formed of a single piece of material;

a hollow shaft positioned within at least a portion of the internal chamber, wherein the shaft defines a piston separating the internal chamber into a first portion between the piston and the first end and a second portion between the piston and the second end, wherein the piston is integral with the shaft;

a check valve seated in the opening;

a biasing member between the piston and the first end of the body;

tubing fitted in the hollow shaft and extending into an inner bore of the piston; and a spray nozzle in fluid communication with the second portion of the internal chamber.

31. The pump attachment of claim 30, further comprising a container defining a reservoir and an opening into the reservoir wherein the pump attachment is secured to the container with at least a portion of the body extending into the reservoir.

32. The pump attachment of claim 30, further comprising a handle in communication with the shaft.

33. The pump attachment of claim 30, further comprising a handle integrally connected to the shaft.

34. The pump attachment of claim 30, wherein the piston comprises a piston sealingly engaged with at least a portion of the wall of the body.

35. The pump attachment of claim 30, wherein the tubing extends between the spray nozzle and the second portion of the internal chamber.

36. The pump attachment of claim 30, wherein the hollow shaft further comprises a channel therethrough with a first shaft opening proximate the first end of the body and a second shaft opening in communication with the second portion of the internal chamber.

37. A pump attachment, comprising:

a body having a first end, a second end with an annular overhanging lip defining an opening and a depending flange extending downward from the annular lip surrounding the opening in the second end, and a wall between the first end and the second end wherein the first end, second end, and wall define an internal chamber;

a shaft positioned within at least a portion of the internal chamber, wherein the shaft defines a piston separating the internal chamber into a first portion between the piston and the first end and a second portion between the piston and the second end, wherein the piston is integral with the shaft;

a check valve seated in the opening;

a biasing member between the piston and the first end of the body;

a spray nozzle in fluid communication with the second portion of the internal chamber; and tubing connected between the spray nozzle and the shaft, wherein the tubing extends at least to the first shaft opening, wherein the shaft further comprises a hollow shaft having a channel therethrough with a first shaft opening proximate the first end of the body and a second shaft opening in communication with the second portion of the internal chamber.

38. The pump attachment of claim 37, wherein the tubing is connected between the first shaft opening and the spray nozzle.

39. The pump attachment of claim 37, wherein the tubing is connected to the spray nozzle and extends through the shaft and is connected to the piston.

40. The pump attachment of claim 37, wherein the tubing is fitted in the channel of the hollow shaft and extends into an inner bore of the piston;

wherein the pump attachment further comprises a plug comprising an inner plug bore extending into the inner bore of the piston wherein the tubing is positioned between an inner wall of the inner bore of the piston and an outer wall of the plug; and wherein the plug comprises a radial flange contacting a lower surface of the piston.

* * * * *